2,795,598

PESTICIDES AND PROCESS FOR THEIR MANUFACTURE

Otto Scherer, Gerhard Stähler, and Heinz Frensch, Frankfurt am Main, Germany, assignors to Farbwerke Hoechst Aktiengesellschaft vormals Meister Lucius & Brüning, Frankfurt am Main, Germany, a corporation of Germany No Drawing. Application November 1, 1955, Serial No. 544,350

Claims priority, application Germany November 10, 1954

5 Claims. (Cl. 260—461)

The present invention relates to pesticides and a process for their manufacture.

In the art of pest control the destruction of so-called hygienic pests covers a wide field. The battle against the house fly (*Musca domestica*), known to be a transmitter of many diseases, has been fought on a very broad front. For the last ten years contact insecticides of the chlorinated hydrocarbon series have been mainly used for this purpose. However, resistance phenomena have constantly necessitated the discovery of new pesticides. It has also been proposed to use organic phosphoric acid esters for so-called hygienic pest control.

Recently, neutral phosphoric acid esters have become known, which possess a very good insecticidal action but are relatively non-toxic to warm-blooded animals, for example, O:O-dimethyl-O-(4-nitro-3-chloro-phenyl) - thiophosphoric acid ester, its lethal dose being 500 mg./kg. of bodyweight of rat.

Now we have found that compounds of the general formula

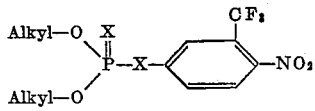

in which X represents an oxygen or sulphur atom, and "alkyl" represents a methyl, ethyl, propyl, or butyl group, are superior to the known phosphoric acid ester pesticides. For example, O:O-dimethyl-O-(4-nitro-3-trifluoromethyl-phenyl)-thiophosphate is six to ten times more effective, coupled with the same toxicity towards warm-blooded animals, than the corresponding 3-chloro-4-nitro-phenyl-thiophosphoric acid ester in its action against flies, as will be seen from the examples given below. Especially important is the fact that in the form of aerosols the new products also possess a lasting activity such as is not observed with the comparable known substances.

Accordingly, this invention provides pesticidal preparations which contain a compound of the above general formula.

The compounds of the above formula can be obtained by reacting an appropriate O:O-dialkyl-thiophosphoric acid chloride in known manner with 4-nitro-3-trifluoromethylphenol.

The compounds can also be used for pest-control in general, for example, in the form of a spraying, dusting or scattering preparation or a solution, if desired, in combination with other pesticides or synergists.

The following examples serve to illustrate the invention, but they are not intended to limit it thereto, the parts being by weight:

Example 1

In a Petri dish test two portions of 1 cc. of each of two solutions of 0.005 percent strength one of O:O-dimethyl - O - (3 - trifluoromethyl - 4 - nitro - phenyl)-thiophosphoric acid ester and the other of O:O-diethyl-O- (3 - trifluoromethyl - 4 - nitro - phenyl) - thiophosphoric acid ester in acetone were distributed each on one half of a dish. Within a period of 30 minutes at 21° C. all the flies (*Musca domestica*) were permanently on their backs.

When, in the same test, O:O-dimethyl-O-(4-nitro-3-chloro-phenyl)-thiophosphate was used, instead of O:O-dimethyl - O - (3 - trifluoromethyl - 4 - nitro - phenyl)-thiophosphoric acid ester or O:O-diethyl-O-(3-trifluoromethyl-4-nitro-phenyl)-thiophosphoric acid ester, a solution of 0.05 percent strength i. e. 10 times the concentration was required to produce the same effect.

Example 2

A spraying preparation is prepared by dissolving 0.1 percent of O:O-dimethyl-O-(3-trifluoromethyl-4-nitrophenyl)-thiophosphoric acid ester or O:O-diethyl-O-(3-trifluoromethyl-4-nitro-phenyl)-thiophosphoric acid ester in petroleum. When this preparation is sprayed in a room at the rate of 2 cc. per cubic metre of room space, *Musca domestica* in the room become motionless in 15 to 30 minutes.

If O:O-dimethyl-O-(4-nitro-3-chloro-phenyl)-thiophosphate is used in a similar manner more than five times the concentration is required in order to produce the same effect.

The following table shows the percentages of four-day old flies which are found permanently lying on their backs at 27° C.:

| | Concentration | After— | | |
|---|---|---|---|---|
| | | 15 minutes | 30 minutes | 45 minutes |
| O:O - dimethyl - O - (3 - trifluoromethyl-4-nitro-phenyl)-thiophosphoric acid ester | 0.1 | 95 | 96 | 97 |
| O:O - diethyl - O - (3 - trifluoromethyl-4-nitro-phenyl)-thiophosphoric acid ester | 0.1 | 97 | 99 | 99 |
| O:O - dimethyl - O - (4-nitro-3-chloro-phenyl)-thiophosphoric acid ester | 0.5 | 73 | 97 | 97 |

The following table shows the effect at 23° C. produced by O:O-dimethyl-O-(3-trifluoromethyl - 4 - nitro-phenyl)-thiophosphoric acid ester and O:O-diethyl-O-(3-trifluoromethyl-4-nitro-phenyl-thiophosphoric acid ester, on the one hand, and that produced by O:O-dimethyl-O-(4-nitro-3-chloro-phenyl)-thiophosphoric acid ester at the same and at twice the concentration, on the other:

| | Concentration | After— | | |
|---|---|---|---|---|
| | | 15 minutes | 30 minutes | 45 minutes |
| O:O - dimethyl - O - (3 - trifluoromethyl-4-nitro-phenyl)-thiophosphoric acid ester | 0.1 | 37 | 93 | 99 |
| O:O - diethyl - O - (3 - trifluoromethyl-4-nitro-phenyl)-thiophosphoric acid ester | 0.1 | 41 | 99 | 100 |
| O:O-dimethyl - O - (4 - nitro - 3 - chlorophenyl) - thiophosphoric acid ester | 0.2 | 23 | 77 | 88 |
| O:O-dimethyl - O - (4 - nitro - 3 - chlorophenyl) - thiophosphoric acid ester | 0.1 | 7 | 58 | 82 |

Similar or in some cases even greater differences are obtained when substances are sprayed in an aqueous emulsion.

Example 3

An aerosol preparation for combatting flies and other insects is prepared as follows: 5 parts of O:O-dimethyl-O-(3-trifluoromethyl-4-nitro-phenyl)-thiophosphoric acid ester are mixed with 6.5 parts of petroleum and 3.5 parts of dipentene. The solution so obtained is charged in the cold, together with 85 parts of dichloro-difluoromethane serving as propellant, into low pressure aerosol cans.

When, for example, the aerosol preparation is discharged in a closed room at the rate of 0.3 gram of the preparation per cubic metre of room space at a room temperature of 22° C., for example, 50 percent of the flies (*Musca domestica*) lie motionless on the floor after 15 minutes, about 90 percent after 25 minutes and the remainder within at most 1 hour, all the flies dying rapidly without substantial movement. An important advantage is that with this small quantity of the aerosol preparation the room is rendered uninhabitable by vermin, such as flies, for a long time. Even when a room thus treated is subsequently aired for several hours, flies placed in the room in the next few days die within a few hours in the same inconspicuous manner.

An equivalent aerosol preparation containing O:O-dimethyl-O-(4-nitro-3 - chlorophenyl) - thiophosphoric acid ester as active substance has under the same conditions, even from the outset, a considerably slower action, so that after ½ hour no appreciable relief from flies is attained and after 1 hour not all the flies have been destroyed. When flies are introduced into a room three days after it has been treated with O:O-dimethyl-O-(4-nitro-3-chloro-phenyl)-thiophosphoric acid ester as described above, and windows and doors are kept closed, there is hardly any reduction in the number of flies even after a further 24 hours.

We claim:

1. Compounds of the general formula

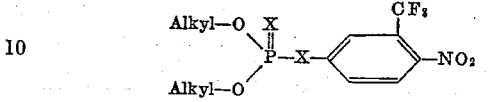

in which X represents a member of the group consisting of oxygen and sulfur, and "alkyl" represents a member of the group consisting of methyl, ethyl, propyl and butyl.

2. O:O - dimethyl - O - (3 - trifluoromethyl - 4 - nitrophenyl)-thiophosphoric acid ester.

3. O:O - diethyl - O - (3 - trifluoromethyl - 4 - nitrophenyl)-thiophosphoric acid ester.

4. A process for the manufacture of a compound claimed in claim 1, wherein an appropriate O:O-dialkyl-thiophosphoric acid chloride is reacted with 4-nitro-3-tri-fluoromethyl-phenol.

5. Pesticidal preparations which comprise a compound claimed in claim 1 in admixture with a diluent.

No references cited.